US009401903B2

(12) United States Patent
Vanover et al.

(10) Patent No.: US 9,401,903 B2
(45) Date of Patent: Jul. 26, 2016

(54) FACILITATING ACCESS TO DATA FROM VIRTUAL PRIVATE NETWORKS

(75) Inventors: Michael T. Vanover, Raleigh, NC (US); Steven R. Perrin, Raleigh, NC (US); Justin T. Dubs, Durham, NC (US); Jennifer G. Zawacki, Hillsborough, NC (US); James J. Thrasher, Efland, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1502 days.

(21) Appl. No.: 12/277,563

(22) Filed: Nov. 25, 2008

(65) Prior Publication Data
US 2010/0132032 A1 May 27, 2010

(51) Int. Cl.
*G06F 21/00* (2013.01)
*H04L 29/06* (2006.01)

(52) U.S. Cl.
CPC ............. *H04L 63/08* (2013.01); *H04L 63/0272* (2013.01)

(58) Field of Classification Search
CPC ... H04L 63/0272; H04L 63/08; G06F 21/606; H04W 12/06
USPC .............. 726/6–7, 14–15; 713/330, 340, 713/300–324
See application file for complete search history.

(56) References Cited

U.S. PATENT DOCUMENTS

| 7,814,361 B2* | 10/2010 | Higham et al. ............... 713/400 |
| 8,006,110 B2* | 8/2011 | Ober ............................. 713/324 |
| 2004/0068666 A1* | 4/2004 | Tosey ............................ 713/201 |
| 2005/0076087 A1* | 4/2005 | Budd et al. .................... 709/206 |
| 2005/0235353 A1* | 10/2005 | Tsay et al. ...................... 726/15 |
| 2006/0036854 A1* | 2/2006 | Liu ................................ 713/165 |
| 2006/0129861 A1* | 6/2006 | Kee et al. ....................... 713/323 |
| 2007/0118895 A1* | 5/2007 | Coskun et al. .................. 726/15 |
| 2007/0238440 A1* | 10/2007 | Sengupta et al. ........... 455/343.2 |
| 2009/0003319 A1* | 1/2009 | Sood et al. ..................... 370/352 |
| 2009/0089808 A1* | 4/2009 | Locker et al. .................. 719/319 |
| 2009/0135751 A1* | 5/2009 | Hodges et al. ................. 370/311 |
| 2010/0023788 A1* | 1/2010 | Scott et al. .................... 713/320 |

OTHER PUBLICATIONS

"Somniloquy: Maintaining Network Connectivity While Your Computer Sleeps" (Mar. 2008) Agarwal et al.; 14 pages; originally downloaded from http://research.microsoft.com/pubs/70560/tr-2008-42.pdf.*

* cited by examiner

*Primary Examiner* — Catherine Thiaw
(74) *Attorney, Agent, or Firm* — Ference & Associates LLC

(57) ABSTRACT

Arrangements and methods for facilitating access to VPN-derived data regardless of computing platform power state.

15 Claims, 2 Drawing Sheets

FACILITATING ACCESS TO DATA FROM VIRTUAL PRIVATE NETWORKS

FIELD OF THE INVENTION

The present invention relates generally to computer systems and their use in virtual private networks.

BACKGROUND OF THE INVENTION

VPN's (virtual private networks) are often used within organizations as an efficient manner for members of the organization to log into an intranet or other local/organizational network from, e.g., a desktop or laptop and over a wireless or wired connection. This permits quick and easy access, while on-site or otherwise at a system with a permanent or ongoing connection into the VPN, to databases or other features that are specific or relevant to the organization in question.

Typically, there is a credentialing process for identifying the user. In this capacity, the user will interact with a VPN "gateway" computer. Once credentials are established, a key that is likely not known to the user will be exchanged with the gateway, and this will permit the user's continued access for a current session; any information exchange with the gateway will be encrypted by way of the key (and decrypted at the gateway).

It is known to be able to log into a VPN from a remote location. However, hindrances and disadvantages continue to arise in the event that a user wishes to stay connected to the VPN for a longer period of time, or at least have access to VPN-derived data, despite any potential "breaks" that are met. This stems from the fact that VPN connections are typically broken up when a computer goes into any mode (such as suspend or hibernation, commonly referred to as S3 and S4, respectively) other than a fully powered on mode (commonly S0).

Accordingly, if a user so much as closes a laptop lid in order (for instance) to proceed through security at an airport or simply transport the laptop easily between two points, an entire VPN connection process will need to be undertaken anew, even if the suspend or hibernation is only for a few minutes. Considering the length of time that a VPN connection process usually entails, this tends to highly discourage users from reconnecting with a VPN in order to access its data once the opportunity arises to power on the computer again.

Accordingly, a compelling need has been recognized in connection with overcoming disadvantages such as those mentioned above.

SUMMARY OF THE INVENTION

Broadly contemplated herein, in accordance with at least one presently preferred embodiment of the present invention, are arrangements and methods for facilitating access to VPN-derived data regardless of computing platform power state.

In summary, one aspect of the invention provides an apparatus comprising: a physical computing device; a main memory in communication with the physical computing device; a dedicated memory different from the main memory, the dedicated memory acting to store data associated with a virtual private network; a processor which manages interaction with a virtual private network; the processor acting to: receive data from a virtual private network and direct such data to the dedicated memory; manage a credentialing process related to a virtual private network; and provide access to data in the dedicated memory responsive to a successful credentialing process.

Another aspect of the invention provides a method comprising: providing a physical computing device; providing a main memory in communication with the physical computing device; receiving data from a virtual private network and directing such data to a dedicated memory different from the main memory; undertaking a credentialing process related to a virtual private network; and providing access to data in the dedicated memory responsive to a successful credentialing process.

Furthermore, an additional aspect of the invention provides a program storage device readable by machine, tangibly embodying a program of instructions executable by the machine to perform a method comprising: providing a physical computing device; providing a main memory in communication with the physical computing device; receiving data from a virtual private network and directing such data to a dedicated memory different from the main memory; undertaking a credentialing process related to a virtual private network; and providing access to data in the dedicated memory responsive to a successful credentialing process.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
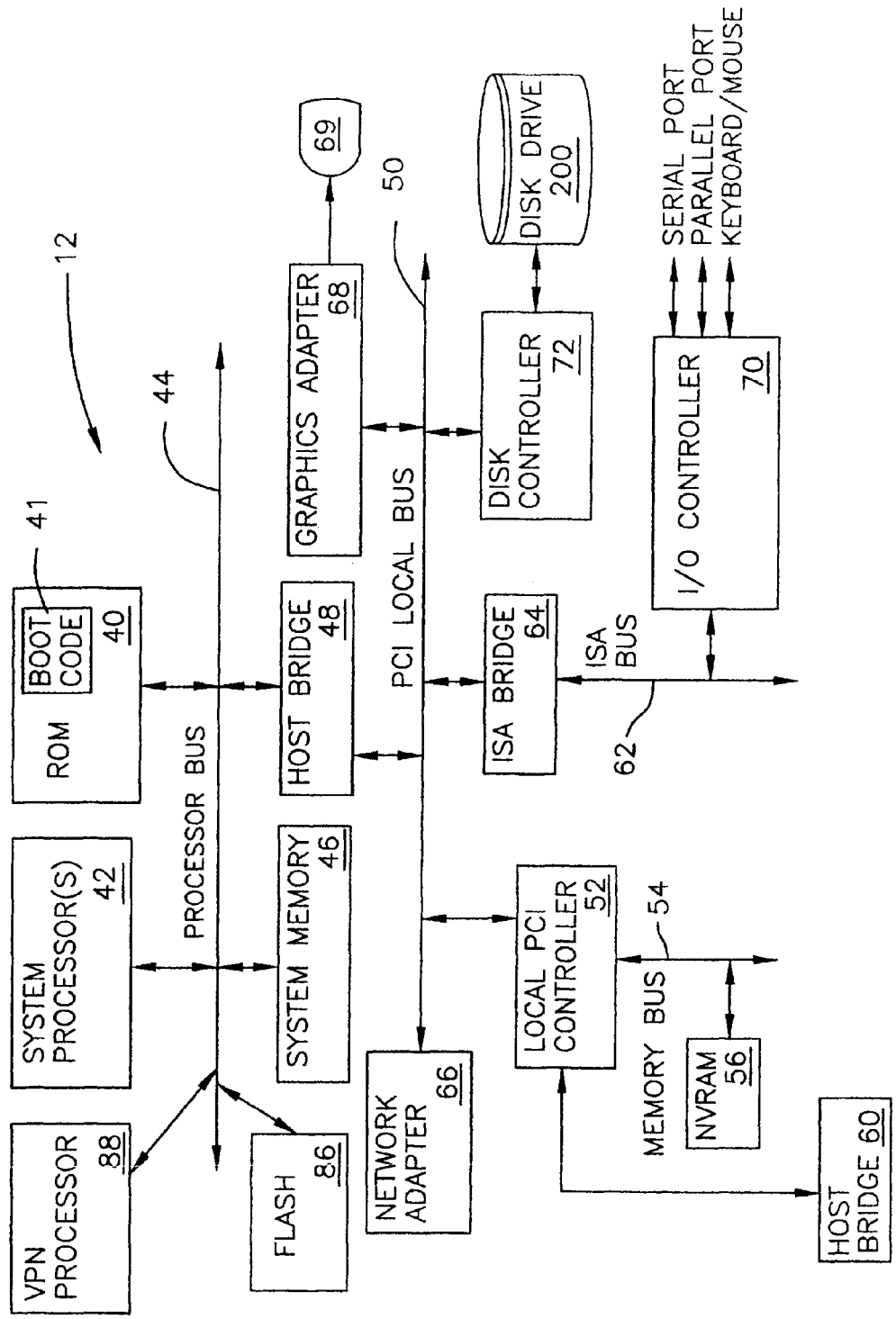
FIG. 1 schematically illustrates a computer system.
Figure 2:
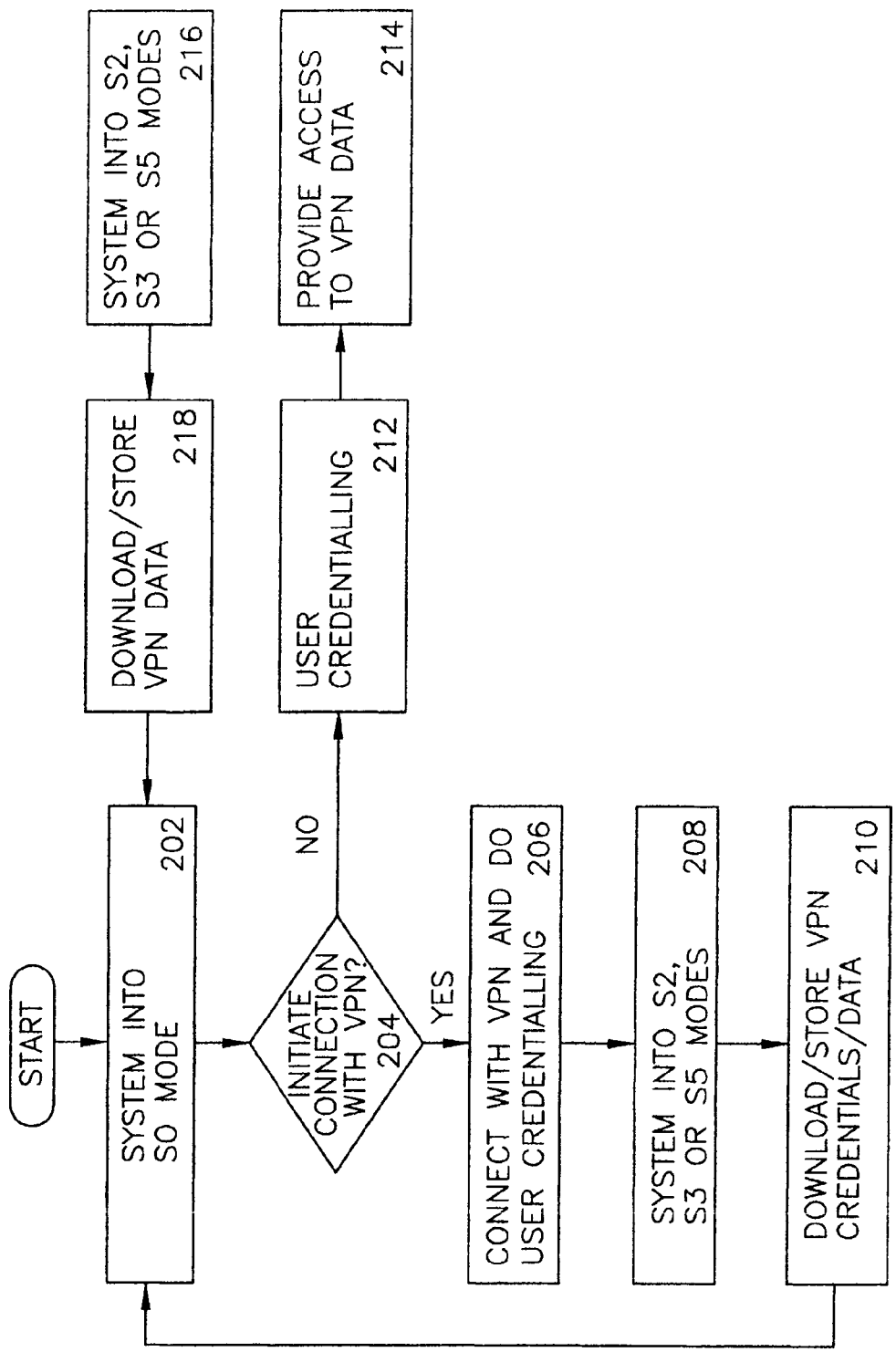
FIG. 2 schematically illustrates a process of facilitating access to VPN data.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention.

One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Generally, embodiments of the present invention are broadly contemplated in connection with use in a group arrangement, such as an arrangement comprising a server and clients. Such an arrangement, for instance, may be found within an IT organization. It will be appreciated from the discussion herethroughout that embodiments of the present invention present unique advantages in the context of a server-client setting, where security measures arranged at the server and client side alike result in efficient and much less cumbersome system access than in the case of conventional arrangements.

Referring now to FIG. 1, there is depicted a block diagram of an illustrative embodiment of a computer system 12. Such a computer system 12 can represent a "client" as understood herein in the context of a client-server setting. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Further illustrated in FIG. 1 are a flash memory 86 and a "VPN processor" 88, whose function will be better appreciated from the discussion herebelow. The flash memory 86 could be integrated with the system BIOS (not shown) or be provided elsewhere within system 12. The VPN processor 88 could be embodied in essentially any manner deemed suitable; for instance, it could be integrated into system processor (s) 42 or be embodied as a separate processor. Preferably, VPN processor 88 is configured for specifically handling tasks related to obtaining VPN credentials and/or data from a VPN network and storing the same in a memory such as flash memory 86. It could even be configured to undertake such tasks when the system 12 is in a low-power state, as will be better appreciated from the discussion herebelow.

Generally, there is broadly contemplated herein, in accordance with at least one presently preferred embodiment of the present invention, a "persistent VPN" arrangement in which either or both features are present:
  a) a current VPN connection that is already credentialed will not be severed when the computer changes to a suspend or hibernate mode; and
  b) a provision for performing unattended data retrieval activities, such as mail fetch, patch management, or software downloads.

In accordance with a presently preferred embodiment of the present invention, both of these features will be afforded in a manner now to be described.

Prior to enabling a "persistent" VPN connection, the user will supply credentials. These credentials are verified over network and applied to the persistent VPN system. These credentials are then preferably stored, e.g., in a flash drive. Thence, the user will preferably be challenged after each power state change (i.e., in changes from suspend or hibernate modes to power-on), to access new data brought down through the persistent VPN. This secondary challenge can be accomplished while the user is offline, as the credentials can be verified against the credentials stored in the persistent VPN. If the user fails to authenticate, the data will remain inaccessible, stored securely in flash.

This applies readily to computing platforms that connect unattended to the VPN in question, in that the same level of security should preferably be applied prior to the user accessing the data that was downloaded unattended.

Turning to FIG. 2, which illustrates a process of facilitating access to VPN data in accordance with a preferred embodiment of the present invention, upon system power-on, or entry into S0 state (202), if the user initiates connection with a VPN (204), then the connection is made while, per convention, the user enters his/her VPN credentials (206) (e.g., typing in a password, inputting biometric data such as a fingerprint, or even merely clicking on an "I Agree" checkbox as might be found at a Wi-Fi hotspot at a commercial establishment such as a coffee bar). Eventually, the system will transfer to S2, S3 or S5 modes (suspend, hibernate or power-off, respectively) (208), during or just after which the user's credentials for the VPN in question preferably will be stored (210) at the flash (86 in FIG. 1) or other memory location.

This act of storing is preferably undertaken by a dedicated VPN processor (88 in FIG. 1), which, as stated above, may be part of the main system processor(s) 42 or separate therefrom. The storing may be coincident with or immediately after the transfer (208) to any of the three mentioned states. If the system transfers to a low-power state (S2 or S3), then it is conceivable for the VPN processor (88 in FIG. 1) to be operable to download data and/or VPN credentials and/or other items even when the main system memory 46 itself powered off in such low-power states. This, in fact, represents an "always-on" arrangement where a capability is maintained to still receive information or data in a low-power state via a wireless communication arrangement involving, e.g., "Bluetooth", WWAN (Wireless Wide Area Network), WiFi, among other conceivable arrangements.

It will now be appreciated that in accordance with at least one embodiment of the present invention, a user will be able to readily access VPN-derived data even if there is no current connection with the VPN. As shown, when the system transfers to S0 mode anew (202), a connection with the VPN will not (204) necessarily need to be reestablished if a user wishes to gain access to VPN-derived data. As shown, the user need only undertake basic VPN-related credentialing 212 (e.g., performed by the processor 88 of FIG. 1 on the basis of credentialing data that has been downloaded from the VPN and stored in flash 86 of FIG. 1) in order to gain access to VPN-derived data 214. Once the system transfers back to suspend, hibernate or power-off modes (216), additional VPN data could be downloaded and stored (218), whereupon a return to S0 mode (202) will allow the user to be availed once again of the opportunity to re-credential (212) without the necessity of a VPN connection to gain access again (214) to VPN-derived data.

To elaborate on some aspects of the process just described, it will be appreciated that in accordance with at least one embodiment of the present invention a VPN connection can be re-established automatically by the system without the user necessarily directing the same. In other words, for instance, upon a transfer to S2, S3 or S5 modes (216), a connection to the VPN can automatically be established for the purpose of downloading and storing VPN-derived data (218). Various conceivable arrangements can be provided for this purpose such as, e.g., a timer which "wakes" the VPN processor (at 88 in FIG. 1) in a manner to re-establish a VPN connection. Data download from the VPN can be conducted in essentially any manner deemed suitable, e.g., in accordance with a protocol that governs the receipt at the system of new VPN data, data updates, or targeted data that may have been predetermined by the user. Downloading during an S5 state can be brought about via an "always-on" arrangement as discussed further above.

On the other hand, it will be appreciated that if there already is a current VPN connection (as with step 206), then a transfer into S2, S3 or S5 nodes (208) can preferably result in a maintenance of the VPN connection for the purpose of continuing to download and store data from the VPN (210). Again, the receipt and storage of data could be governed by essentially any suitable protocol as just discussed above.

Generally, it will be appreciated that the processes and arrangements broadly contemplated herein can find great utility in settings where a user inevitably loses, or chooses to sever, a VPN connection yet wishes to be availed of updated data from the VPN. For instance, if a user is at an airport and needs to close a laptop lid (thus putting the system into S2 or S3 modes), downloading of VPN-derived data can continue until the VPN connection indeed is lost. The connection may be severed, for instance, when the user switches off all wireless radios through use of a radio switch or software function, as one may wish to do before takeoff of a commercial airplane flight. Hardware "off" switches are known and can be used for this "kill switch" effect, as can known software mechanisms that are able to disable any radio functions of a computer (whether via a timed or conditional automatic protocol, and/or through manual intervention of the user). Similar considerations here of course hold true if radio/wireless connection is severed inadvertently, e.g., by moving the system into a remote area that lacks radio/wireless access.

After any radio or wireless connection has been severed by whatever means, the user can still present credentials (212) such that the flash (at 86 in FIG. 1) or other dedicated memory is "unlocked" and able to transmit VPN-derived data to the main operating system (at 214). Thus, the user is not so much connecting to the VPN, but presenting similar credentials as to access data derived therefrom, itself which has already been downloaded and stored. The effect may even be thought of as a "pseudo" VPN connection, where the user is able to optimally gain access to as much VPN-derived data as can be obtained in the context of no current (ongoing) VPN connection.

It should further be appreciated that there may also be times when a user does not wish to connect to a VPN even if that is technically possible, and instead merely present credentials as just described to gain access to VPN-derived data already stored in the system.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
   a physical computing device having:
   a main memory;
   a dedicated memory different from said main memory, said dedicated memory acting to store data associated with a virtual private network;
   a processor which manages credentialing related to accessing data using the virtual private network;
   said processor acting to:
   receive data from the virtual private network and direct such data to said dedicated memory;
   manage a credentialing process related to accessing the virtual private network and accessing data retrieved from the virtual private network and stored in said dedicated memory; and
   provide access to data in said dedicated memory responsive to a successful credentialing process;
   wherein said processor further performs unattended data retrieval and storage to said dedicated memory in response to said physical computing device being in a low-power state and connected to the virtual private network; and
   wherein said processor further performs, responsive to resuming from a low-power state of the physical computing device, the credentialing process and accesses the retrieved data in the dedicated memory while said physical computing device is not connected with the virtual private network.

2. The apparatus according to claim 1, wherein said processor acts to receive data from the virtual private network in a suspend state of said physical computing device.

3. The apparatus according to claim 1, wherein said processor acts to receive data from the virtual private network in a hibernate state of said physical computing device.

4. The apparatus according to claim 1, wherein said dedicated memory comprises a flash memory.

5. The apparatus according to claim 1, wherein said processor acts to automatically receive data from the virtual private network upon transfer of said physical computing device from a power-on state to a low-power state.

6. The apparatus according to claim 1, wherein said processor acts to automatically attempt connection with the virtual private network upon transfer of said physical computing device from a power-on state to a low-power state.

7. The apparatus according to claim 1, wherein said dedicated memory further acts to store credentialing information used in a credentialing process managed by said processor.

8. A method comprising:
operating a physical computing device having a main memory in communication with the physical computing device;
receiving data from a virtual private network and directing such data to a dedicated memory different from the main memory;
undertaking a credentialing process related to accessing the virtual private network and accessing data retrieved from the virtual private network and stored in said dedicated memory;
performing unattended data retrieval and storage to said dedicated memory in response to said physical computing device being in a low-power state and connected to the virtual private network; and
providing access to data in the dedicated memory responsive to a successful credentialing process; and
performing, responsive to resuming from a low-power state of the physical computing device, the credentialing process and accesses the retrieved data in the dedicated memory while said physical computing device is not connected with the virtual private network.

9. The method according to claim 8, wherein said receiving of data in a low-power state of the physical computing device comprises receiving data from the virtual private network in a suspend state of the physical computing device.

10. The method according to claim 8, wherein said receiving of data in a low-power state of the physical computing device comprises receiving data from the virtual private network in a hibernate state of the physical computing device.

11. The method according to claim 8, wherein the dedicated memory comprises a flash memory.

12. The method according to claim 8, wherein said receiving comprises automatically receiving data from the virtual private network upon transfer of the physical computing device from a power-on state to a low-power state.

13. The method according to claim 8, further comprising automatically attempting connection with the virtual private network upon transfer of the physical computing device from a power-on state to a low-power state.

14. The method according to claim 8, wherein said directing comprises storing in the dedicated memory credentialing information for use in said undertaking of a credentialing process.

15. A program storage device readable by machine, embodying a program of instructions executable by the machine and comprising:
instructions that operate a physical computing device having a main memory in communication with the physical computing device;
instructions that receive data from a virtual private network and directing such data to a dedicated memory different from the main memory;
instructions that undertake a credentialing process related to accessing the virtual private network and accessing data retrieved from the virtual private network and stored in said dedicated memory;
instructions that perform unattended data retrieval and storage to said dedicated memory in response to said physical computing device being in a low-power state and connected to the virtual private network; and
instructions that provide access to data in the dedicated memory responsive to a successful credentialing process; and
instructions that perform, responsive to resuming from a low-power state of the physical computing device, the credentialing process and accesses the retrieved data in the dedicated memory while said physical computing device is not connected with the virtual private network.

* * * * *